United States Patent
Hirouchi

(10) Patent No.: US 11,709,644 B2
(45) Date of Patent: Jul. 25, 2023

(54) IMAGE PROCESSING APPARATUS CONNECTED TO ANOTHER APPARATUS BY A USB CABLE AND COMMUNICATING WITH THE ANOTHER APPARATUS VIA A USB COMMUNICATION, METHOD FOR CONTROLLING THE IMAGE PROCESSING APPARATUS, AND STORAGE MEDIUM THEREOF

(71) Applicant: CANON KABUSHIKI KAISHA, Tokyo (JP)

(72) Inventor: Yasuo Hirouchi, Ibaraki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 17/525,736

(22) Filed: Nov. 12, 2021

(65) Prior Publication Data

US 2022/0156023 A1    May 19, 2022

(30) Foreign Application Priority Data

Nov. 18, 2020 (JP) .................................. 2020-191448

(51) Int. Cl.
*G06F 3/12* (2006.01)
*G06K 15/00* (2006.01)

(52) U.S. Cl.
CPC .......... *G06F 3/1293* (2013.01); *G06F 3/1203* (2013.01); *G06F 3/1236* (2013.01); *G06K 15/4075* (2013.01)

(58) Field of Classification Search
CPC ....................................................... G06F 3/1208
USPC ........................................................ 358/1.15
See application file for complete search history.

(56) References Cited

U.S. PATENT DOCUMENTS

| | | | |
|---|---|---|---|
| 2011/0261391 A1* | 10/2011 | Oba ...................... | G06F 3/1284 358/1.15 |
| 2015/0319327 A1* | 11/2015 | Hirouchi ............ | H04N 1/00896 358/1.13 |
| 2017/0061268 A1* | 3/2017 | Miyazawa ......... | G06K 15/4075 |
| 2017/0228333 A1* | 8/2017 | Hayashi .................. | G06F 3/06 |

FOREIGN PATENT DOCUMENTS

JP          2002318778 A    10/2002

* cited by examiner

*Primary Examiner* — Jacky X Zheng
(74) *Attorney, Agent, or Firm* — Canon U.S.A., Inc. IP Division

(57) ABSTRACT

An information processing apparatus is capable of communicating via a universal serial bus (USB) cable with a USB host device configured to transmit a first control transfer command at a start of communication. The information processing apparatus includes one or more controllers configured to function as a unit configured to acquire and hold predetermined data in response to having received the first control transfer command from the USB host device and a unit configured to transmit the held predetermined data to the USB host device on the basis of having received a second control transfer command from the USB host device.

11 Claims, 10 Drawing Sheets

IMAGE PROCESSING APPARATUS CONNECTED TO ANOTHER APPARATUS BY A USB CABLE AND COMMUNICATING WITH THE ANOTHER APPARATUS VIA A USB COMMUNICATION, METHOD FOR CONTROLLING THE IMAGE PROCESSING APPARATUS, AND STORAGE MEDIUM THEREOF

BACKGROUND

Field

The present disclosure relates to universal serial bus (USB) communication between a USB device such as an image processing apparatus and a host PC connected by a USB cable.

Description of the Related Art

Some image processing apparatuses are equipped with a Universal Serial Bus (hereinafter, a "USB") device interface (I/F) that can be connected to a host PC with a USB cable. For example, communication between the host PC and the image processing apparatus is performed under a protocol compliant with the USB 2.0 specification (Universal Serial Bus Specification).

USB communication has a communication channel for each port, which is called endpoint. In the basic communication port called Endpoint 0, communication is performed with use of a control transfer protocol. In the data communication port of Endpoint 1 to Endpoint n, communication is performed with protocols such as bulk transfer, interrupt transfer, and isochronous transfer other than the control transfer.

In the case of control transfer, according to the USB 2.0 specification, if there is no response from the device side within 500 ms to the data request from the host PC (hereinafter, an "IN request"), the host PC can stop the IN request. For this reason, the image processing apparatus which is the device side needs to prepare the response data to the IN request for the control transfer within 500 ms.

Japanese Patent Application Laid-Open No. 2002-318778 discusses a technique in which, in communication between a host PC and an image processing apparatus, the host PC is notified of the state of the buffer for bulk transfer, where the image processing apparatus receives data, by performing interrupt transfer in parallel with the bulk transfer. The interrupt transfer is a prescribed communication between the host PC and the device on a regular basis, and thus the host PC can be notified of the state of the buffer for bulk transfer of the image processing apparatus on a regular basis. This makes it possible to adjust the transfer interval for bulk transfers to reduce timeouts.

In the technique of Japanese Patent Application Laid-Open No. 2002-318778, in the case of communication of a port using Endpoint 1 to Endpoint n, by using both bulk transfer and interrupt transfer together, it is possible to notify the host PC of the status on the image processing apparatus side and perform control to adjust the transfer interval of the bulk transfer.

However, in the case of a protocol that uses only Endpoint 0 control transfer, the status of the image processing apparatus cannot be transmitted to the host PC in conjunction with the interrupt transfer described above.

As described above, there is a constraint that the control transfer must be responded within 500 ms. In the case of an image processing apparatus that employs a real-time operating system (RTOS), it is possible to reduce such events that response data cannot be generated within 500 ms by raising the processing priority of the task that generates the data. However, in the case of an image processing apparatus that employs a general-purpose OS (e.g., Linux (registered trademark)), the central processing unit (CPU) occupancy time for each task is evenly divided, and there is an issue that the response data generation within 500 ms is not guaranteed when the CPU processing is busy. This is a common issue also for USB devices other than image processing apparatuses.

SUMMARY

Various embodiments of the present disclosure provide a mechanism that enables the data requested by a host PC to be returned without timeout of commands that require a response within 500 ms in universal serial bus (USB) control transfer where communication is performed at Endpoint 0.

According to one embodiment of the present disclosure, an information processing apparatus is capable of communicating via a universal serial bus (USB) cable with a USB host device configured to transmit a first control transfer command at a start of communication. The information processing apparatus includes one or more controllers configured to function as a unit configured to acquire and hold predetermined data in response to having received the first control transfer command from the USB host device and a unit configured to transmit the held predetermined data to the USB host device on the basis of having received a second control transfer command from the USB host device.

Further features of the present disclosure will become apparent from the following description of example embodiments with reference to the attached drawings.

DESCRIPTION OF THE EMBODIMENTS

Example embodiments of the present disclosure will be described with reference to the drawings. The following example embodiments do not limit the scope of the invention, and all combinations of the features described in the example embodiments are not necessarily essential to every embodiment of the present invention.

Figure 1:
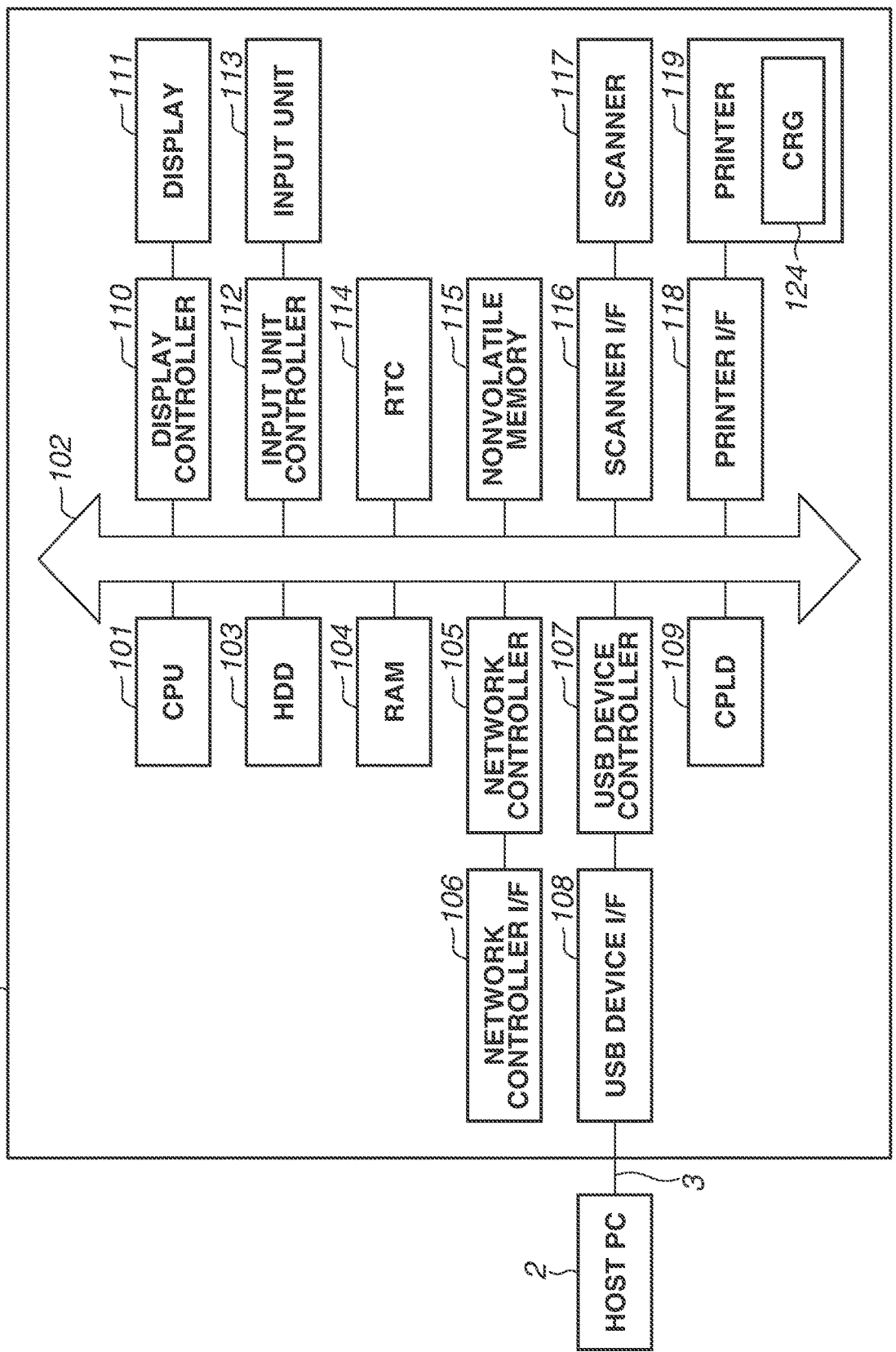
FIG. 1 is a hardware configuration diagram of an image processing apparatus as a universal serial bus (USB) device according to one embodiment.

A first example embodiment will be described. FIG. 1 is a diagram illustrating an example of a hardware configuration of an image processing apparatus as a universal serial bus (USB) device demonstrating one example embodiment of the present disclosure.

An image processing apparatus 1 is a USB device according to the present example embodiment, and can communicate with a host PC 2 via a USB cable 3.

In the image processing apparatus 1, a central processing unit (CPU) 101 is a central processing arithmetic unit that operates software for operating the image processing apparatus 1.

The system bus 102 is a pathway for the CPU 101 to access other units, and for other units to access each other.

A hard disk drive (HDD) 103 is a hard disk unit in which the software of the image processing apparatus 1 and the data and a primary storage file necessary for the operation of the image processing apparatus 1 are stored. Other storage devices (large-capacity nonvolatile memory) such as a solid state drive (SSD) may be provided instead of or in conjunction with the HDD.

A random access memory (RAM) 104 is a random access memory in which the program of the image processing apparatus 1 is developed and which serves as a storage area for variables during program operation and data transferred by dynamic memory access (DMA) from each unit.

A network controller 105 and a network controller interface (I/F) 106 are for communication between the image processing apparatus 1 and other devices on the network (not illustrated).

A USB device controller 107 and a USB device I/F 108 are for communication between the image processing apparatus 1 and the host PC 2 via the USB cable 3.

A complex programmable logic device (CPLD) 109 is a unit that reads the Low/High state of the signal lines on the base circuit via the CPU 101, or that enables the CPU 101 to change the Low/High state setting. The CPLD 109 is a programmable logic device and is a unit that makes it possible to control the ON/OFF of power relations to the image processing apparatus 1. Inside the CPLD 109, there is a general purpose input output (hereinafter, "GPIO"). The CPU 101 can turn ON/OFF the power relations by changing the setting value of its GPIO register.

A display 111 displays the operation status of the image processing apparatus 1 in such a manner that a user or the like can check the operation status. The display controller 110 controls the display on the display 111.

An input unit 113 receives instructions from the user to the image processing apparatus 1. An input unit controller 112 controls the input unit 113. The input unit 113 is specifically an input system such as a keyboard, a mouse, a numeric keypad, cursor keys, a touch panel, or an operation unit keyboard. If the input unit 113 is a touch panel, the input unit 113 is physically attached to the surface of the display 111.

A real time clock (RTC) 114 is a real-time clock having a clock function, an alarm function, a timer function, and the like of the image processing apparatus 1.

A nonvolatile memory 115 is a nonvolatile recording medium other than the HDD 103, which does not have large capacity but is rewritable. The nonvolatile memory may be a static random access memory (hereinafter, a "SRAM"), an electrically erasable programmable read only memory (hereinafter, an "EEPROM"), or the like.

The image processing apparatus 1 is connected to a scanner 117 via a scanner I/F 116.

The image processing apparatus 1 is connected to a printer 119 via a printer I/F 118.

The printer 119 forms an image on a sheet or the like with use of a recording material. A cartridge (hereinafter, a "CRG") 124 in which the recording material is stored is set inside the printer 119.

The recording material includes, for example, toner and ink. In the present example embodiment, the recording material is described as toner, but the recording material may also be ink or the like.

Figure 2:
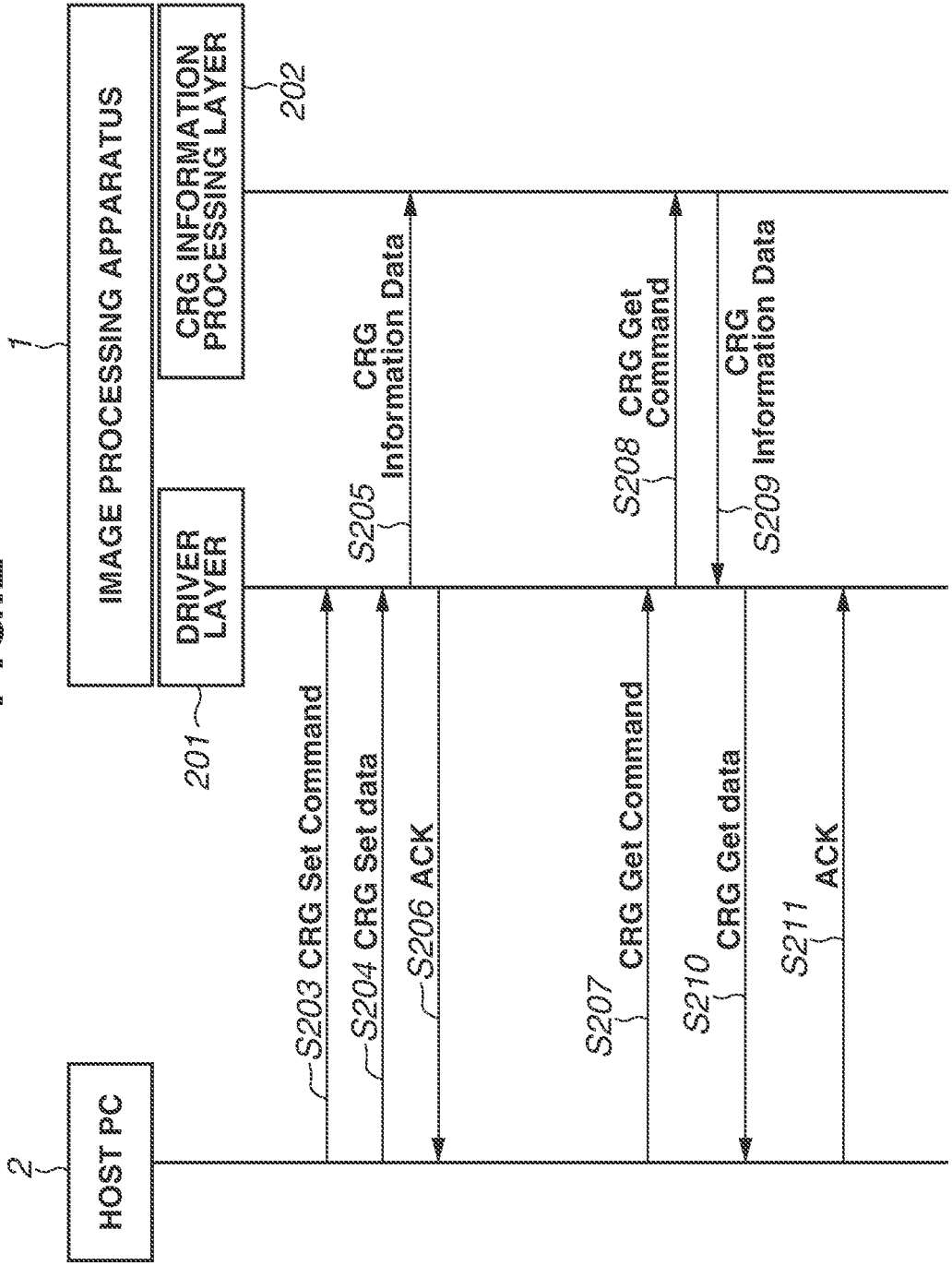
FIG. 2 is a sequence diagram outlining an example of communication using control transfer according to one embodiment.

FIG. 2 is a sequence diagram outlining an example of communication using control transfer with the host PC 2 and the image processing apparatus 1.

The host PC 2 is a device (information processing apparatus) that can operate as a USB host, for example, a personal computer. The host PC 2 is not limited to a personal computer, but may be a tablet computer, a smart phone, or any other device that can operate as a USB host. The host PC 2 is connected to the image processing apparatus 1 with the USB cable 3 and communicates with the image processing apparatus 1. In the communication example illustrated in FIG. 2, the host PC 2 inquires about the remaining amount of toner or the like of the CRG 124 stored in the printer 119 disposed inside the image processing apparatus 1.

Inside the image processing apparatus 1, there are a driver layer 201, which is a software-like module that processes USB packets (hereinafter, a "software module"), and a CRG information processing layer 202, which is a software module that manages CRG information. In other words, the driver layer 201 and the CRG information processing layer 202 function by being implemented by the CPU 101 of the image processing apparatus 1 loading a program stored in the HDD 103 or the like into the RAM 104 and executing the program or the like.

The following is a detailed description of the communication in which the host PC 2 operating as a USB host inquires the image processing apparatus 1 about information (remaining amount of toner) concerning the toner stored in the CRG 124, and the like.

In step S203, the host PC 2 first transmits a CRG Set Command, which is a vendor class command for control transfer, to the image processing apparatus 1.

In step S204, the host PC 2 then transmits the data to be set in the CRG 124, to the image processing apparatus 1.

In the image processing apparatus 1, the command data transmitted from the host PC 2 above is received by the driver layer 201. In step S205, the driver layer 201 transfers the received data to the CRG information processing layer 202. The CRG information processing layer 202 interprets the content of the command data and performs processing.

In step S206, when the processing of step S205 is completed, the driver layer 201 implements an ACK response to the host PC 2, to acknowledge receipt.

In step S207, the host PC 2 transmits a CRG Get Command, which is a vendor class command of the control transfer, to the driver layer 201 to acquire CRG information (e.g., the amount of toner remaining in the CRG 124) of the image processing apparatus 1.

In step S208, the driver layer 201 that has received the CRG Get Command in step S207 transfers the received command to the CRG information processing layer 202.

In step S209, the CRG information processing layer 202 interprets the information of the command received in step S208, collects data corresponding to the command, and returns the data to the driver layer 201 as CRG Information Data. In step S210, the driver layer 201 that has received the CRG Information Data in step S209 transmits the CRG Get data back to the host PC 2.

Upon receipt of the CRG Get data from the driver layer 201, in step S211, the host PC 2 transmits an ACK acknowledging receipt, to the image processing apparatus 1.

The transaction corresponding to the sequence of step S203, step S204, and step S206 (hereinafter, "setup transaction") is started with the transmission (step S203) of the CRG Set Command. The transaction corresponding to the sequence of step S207, step S210, and step S211 (hereinafter, "data transaction") is started with the transmission (step S207) of the CRG Get Command. In the system of the present example embodiment, the setup transaction is performed before the data transaction. If the size of the data to be transferred is larger than the size of the data that can be transferred in a single data transaction, the data transaction may be repeated multiple times to transfer all the data.

The host PC 2 operates as per the USB 2.0 specification. If 500 ms or more elapses between the issuance of the CRG Get Command in step S207 and the receipt of the CRG Get data in step S210, the host PC 2 regards the elapsed time as a timeout and stops acquiring data for the CRG Get Command. For example, if, while the CRG information processing layer 202 is acquiring CRG information, another job originates (e.g., PDL print data processing from the network occurs) and the sufficient CPU resources are not available, the acquisition of the CRG Information Data (step S209) may become slow. In this case, 500 ms or more may have elapsed since step S207, and the driver layer 201 may no longer be able to return the CRG Get data (step S210) to the host PC 2.

Figure 3:
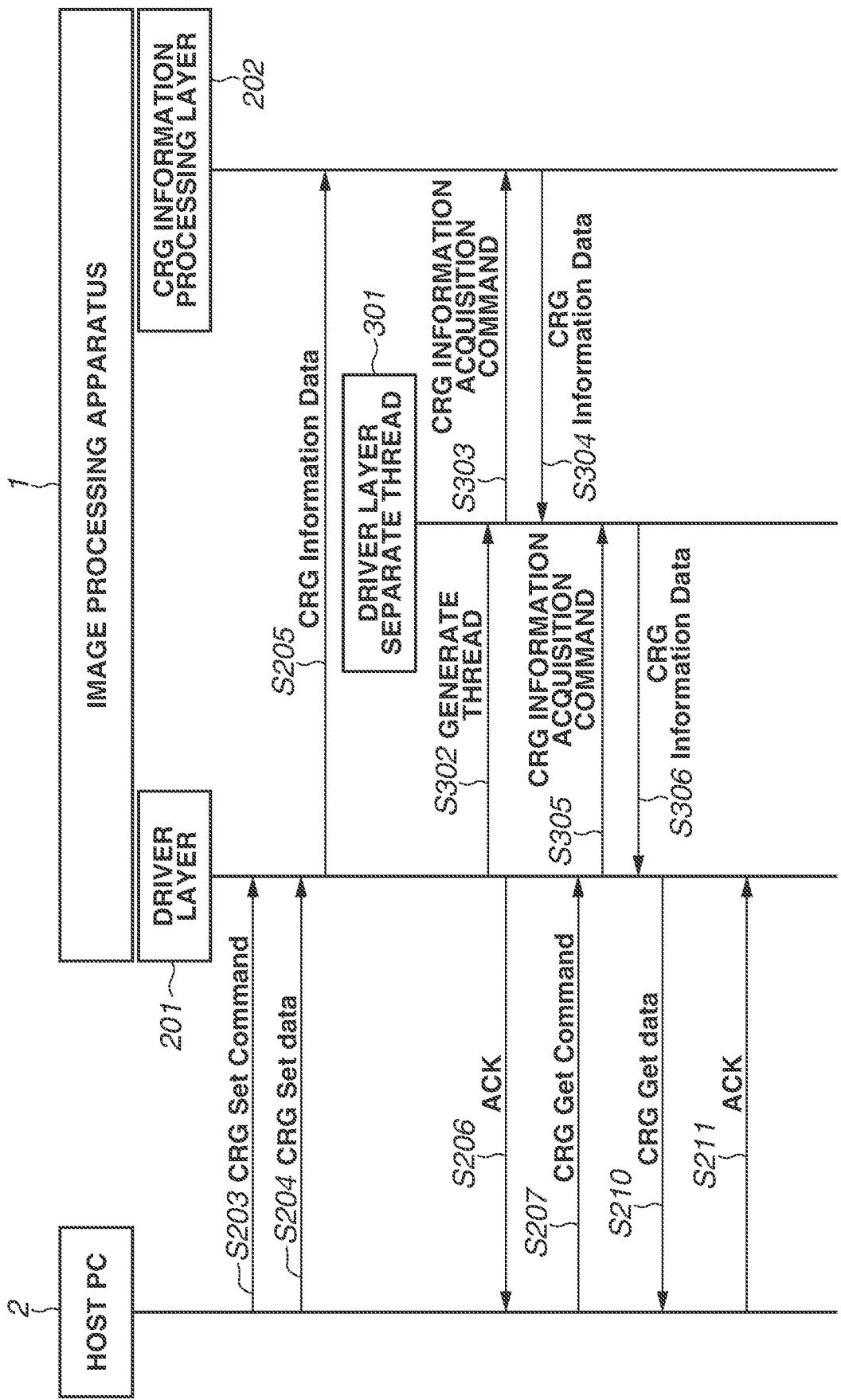
FIG. 3 is a sequence diagram of communication processing using control transfer in a first example embodiment.

The processing to solve this issue is illustrated in the sequence diagram of FIG. 3. The differences from the sequence diagram in FIG. 2 are explained below.

FIG. 3 is a sequence diagram illustrating an example of communication processing using control transfer with the host PC 2 and the image processing apparatus 1 according to the first example embodiment, and the same component as in FIG. 2 is denoted by the same reference numeral.

As is the case with FIG. 2, in step S205, the driver layer 201, which has acquired the CRG Set data from the host PC 2 in the processing of step S204, transmits the CRG Information Data to the CRG information processing layer 202. At the same time as the processing of step S205 is completed, in step S302, the driver layer 201 generates a driver layer separate thread 301, which is a separate thread for generating a CRG information acquisition command. The driver layer separate thread 301 literally operates in a separate thread from the driver layer 201. After the processing of step S302, in step S206, the driver layer 201 returns an ACK response to the host PC 2, and waits to receive the CRG Get Command.

In step S303, the driver layer separate thread 301 transmits a CRG information acquisition command to the CRG information processing layer 202. Upon receipt of the command in S303, in step S304, the CRG information processing layer 202 generates the CRG Information Data and returns the data to the driver layer separate thread 301. After this, the driver layer separate thread 301 waits for the processing (S305) of acquiring CRG information described below.

Upon receipt of the CRG Get Command from the host PC 2 in step S207, in step S305, the driver layer 201 transmits a CRG information acquisition command to the driver layer separate thread 301. In step S306, the driver layer separate thread 301 is subjected to S305 and promptly returns the CRG information acquired in advance in the processing of S304 to the driver layer 201.

In step S210, the driver layer 201 transmits the data received in step S306 to the host PC 2 as CRG Get data. In step S211, the host PC 2 that has received the CRG Get data in the processing of step S210 transmits an ACK command acknowledging receipt, to the driver layer 201.

In other words, the driver layer 201 that controls the USB processing is made into a plurality of threads, and when the SET command is received, the data to be responded by the GET command is acquired in advance by a separate thread (driver layer separate thread 301) from the driver layer 201. When the GET command is received, the above data acquired in advance is sent to the host PC 2.

In FIG. 3, the sequence of the present example embodiment is illustrated. Next, the operation of the respective software modules (the driver layer 201, driver layer separate thread 301, and CRG information processing layer 202) of the image processing apparatus 1 will be described using the flowcharts of FIGS. 4, 5, and 6.

Figure 4:
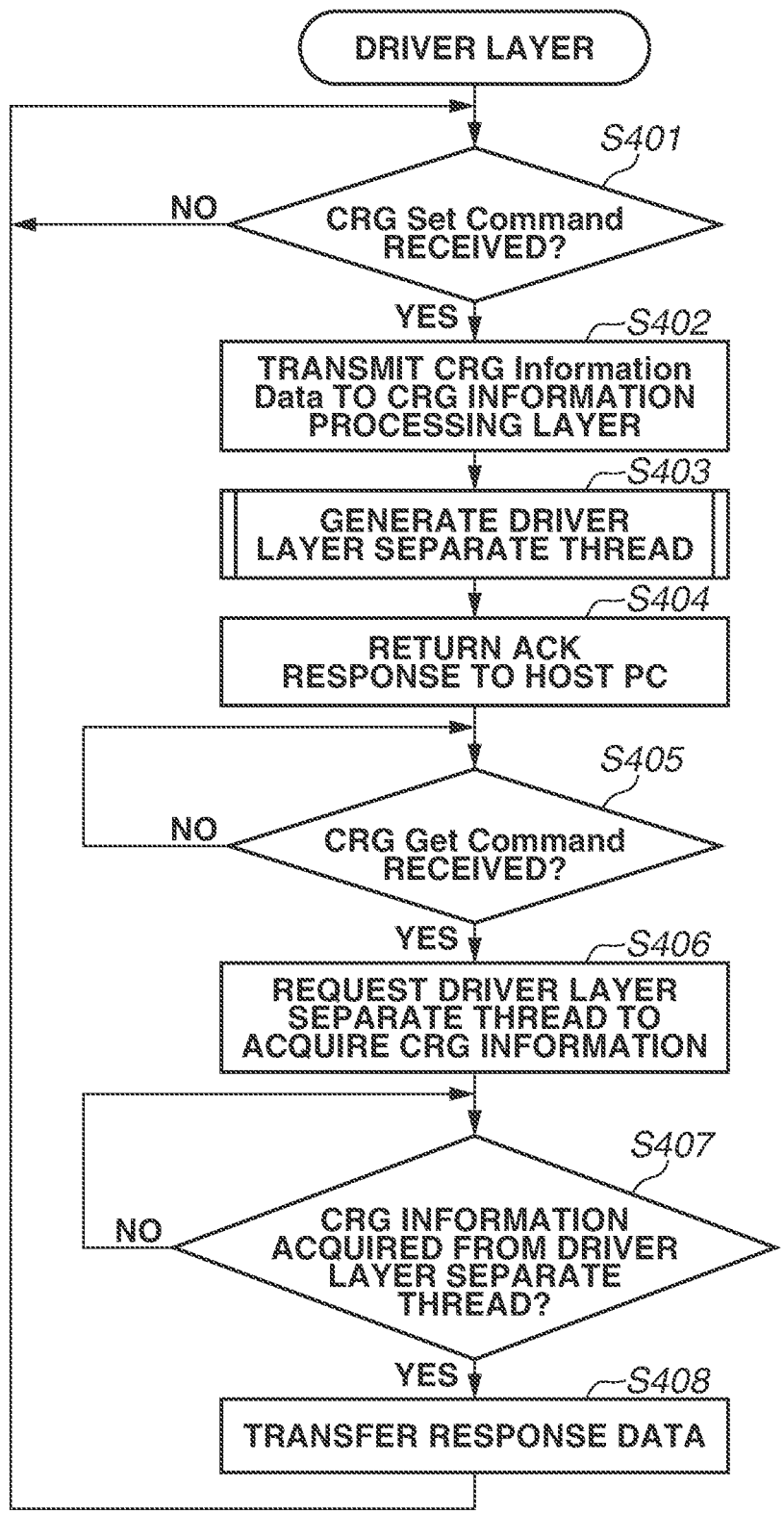
FIG. 4 is a flowchart illustrating an operation of a driver layer according to the first example embodiment.

FIG. 4 is a flowchart illustrating an example of the operation of the driver layer 201 according to the first example embodiment. The processing of this flowchart is implemented by the CPU 101 of the image processing apparatus 1 loading a program stored in the HDD 103 or the like into the RAM 104 and executing the program or the like.

In step S401, the CPU 101 (driver layer 201) waits to receive the CRG Set Command of the vendor class command of the USB control transfer transmitted from the host PC 2 via the USB device I/F 108. The CRG Set Command is always transmitted from the host PC 2 before the CRG Get Command is transmitted.

Upon receipt of the CRG Set Command (Yes in step S401), in step S402, the CPU 101 (driver layer 201) transmits the received command to the CRG information processing layer 202 that manages the CRG 124 information inside the printer 119.

Figure 5:
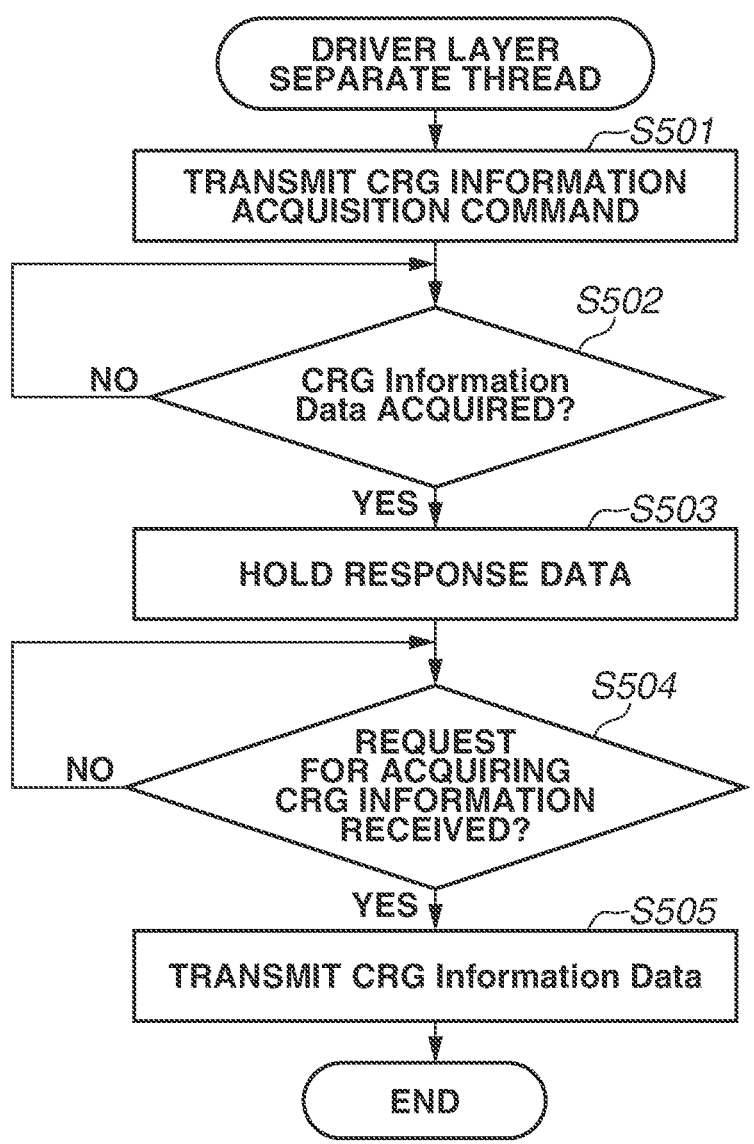
FIG. 5 is a flowchart illustrating an operation of a driver layer separate thread according to the first example embodiment.

In step S403, the CPU 101 (driver layer 201) generates the driver layer separate thread 301. The processing of the driver layer separate thread 301 is illustrated in FIG. 5 described below.

After completing the processing of step S403, in step S404, the CPU 101 (driver layer 201) returns an ACK response indicating that the CRG Set data has been received, to the host PC 2.

In step S405, the CPU 101 (driver layer 201) waits to receive the CRG Get Command of the vendor class command of the USB control transfer transmitted from the host PC 2.

Upon receipt of the CRG Get Command (Yes in step S405), in step S406, the CPU 101 (driver layer 201) requests the driver layer separate thread 301 to acquire CRG information.

In step S407, the CPU 101 (driver layer 201) waits for CRG Information Data to be sent from the driver layer separate thread 301. In step S408, upon acquisition of the CRG Information Data (Yes in step S407), the CPU 101 (driver layer 201) transmits the acquired CRG Information Data to the host PC 2 via the USB device OF 108. After the processing of step S408, the processing returns to step S401 and the CPU 101 (driver layer 201) waits to receive the next CRG Set Command.

FIG. 5 is a flowchart illustrating an example of the operation of the driver layer separate thread 301 according to the first example embodiment. The processing of this flowchart is implemented by the CPU 101 of the image processing apparatus 1 loading a program stored in the HDD 103 or the like into the RAM 104 and executing the program or the like.

Once generated, in step S501, the CPU 101 (driver layer separate thread 301) transmits a CRG information acquisition command to the CRG information processing layer 202.

After the processing of step S501, in step S502, the CPU 101 (driver layer separate thread 301) waits until the CRG Information Data is able to be acquired from the CRG information processing layer 202.

In step S503, upon acquisition of Data in the processing of step S502 (Yes in step S502), the CPU 101 (driver layer separate thread 301) holds the acquired Data on the RAM 104. In other words, the driver layer separate thread 301 acquires the CRG Information Data in advance.

In step S504, the CPU 101 (driver layer separate thread 301) waits for a request by the driver layer 201 for acquiring CRG information.

If the request is received in the processing of step S504 (Yes in step S504), in step S505, the CPU 101 (driver layer separate thread 301) transmits the CRG Information Data held on the RAM 104 to the driver layer 201, and ends the processing.

Figure 6:
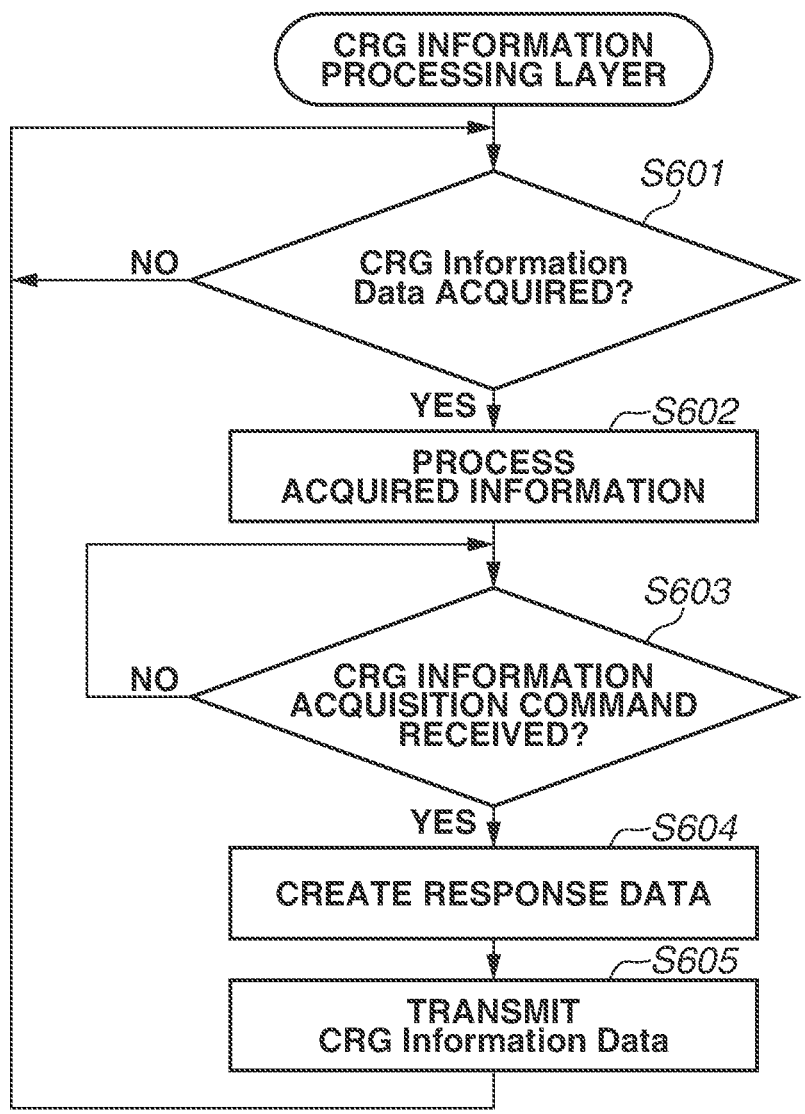
FIG. 6 is a flowchart illustrating an operation of a cartridge (CRG) information processing layer according to the first example embodiment.

FIG. 6 is a flowchart illustrating an example of the operation of the CRG information processing layer 202 according to the first example embodiment. The processing of this flowchart is implemented by the CPU 101 of the image processing apparatus 1 loading a program stored in the HDD 103 or the like into the RAM 104 and executing the program or the like.

In step S601, the CPU 101 (CRG information processing layer 202) waits to receive the CRG Information Data from the driver layer 201.

Upon receipt of the CRG Information Data (Yes in step S601), in step S602, the CPU 101 (CRG information processing layer 202) communicates with the CRG 124 on the basis of the received information, and processes a specified command.

In step S603, the CPU 101 (CRG information processing layer 202) waits to receive a CRG information acquisition command. Here, the CRG information acquisition command is transmitted from the driver layer separate thread 301. Upon receipt of the CRG information acquisition command (Yes in step S603), in step S604, the CPU 101 (CRG information processing layer 202) communicates with the CRG 124, acquires the CRG information, and creates the response data.

In step S605, the CPU 101 (CRG information processing layer 202) transmits the data created in step S604 back to the transmitter of the CRG information acquisition command (driver layer separate thread 301 in the above example). After the processing of step S605, the processing returns to step S601, and the CPU 101 (CRG information processing layer 202) waits to receive the next CRG Information Data.

The sequence illustrated in FIG. 3 and the processing of each software module illustrated in FIGS. 4, 5, and 6 make it possible to make a reply within 500 ms of the control transfer to the host PC 2 regardless of the load status of the CPU 101 of the image processing apparatus 1.

A second example embodiment will be described. The time interval between the CRG Set Command and CRG Get Command commands issued by the host PC 2 (the interval between the processing of step S203 and the processing of step S207) may become large. In this case, in the configuration of the first example embodiment, the information in the CRG Get data acquired as a result of the CRG Get Command is not necessarily the latest data (or the difference from the latest data may be large).

For example, to illustrate an extreme example, when a large number of different PDL print jobs are processed in the image processing apparatus 1 via the network controller I/F 106 after the host PC 2 issues a CRG Set Command in step S203, a variation occurs in the toner information of the CRG. If a CRG Get Command is issued in step S207 after 10 minutes has elapsed from the processing of step S203, the information in the CRG Get data acquired as a result will be the information from 10 minutes before. In this case, it is assumed that the information in the CRG Get data to be acquired is not the latest information (or the difference from the latest information is large). A second example embodiment that solves this issue is described below.

Figure 7:
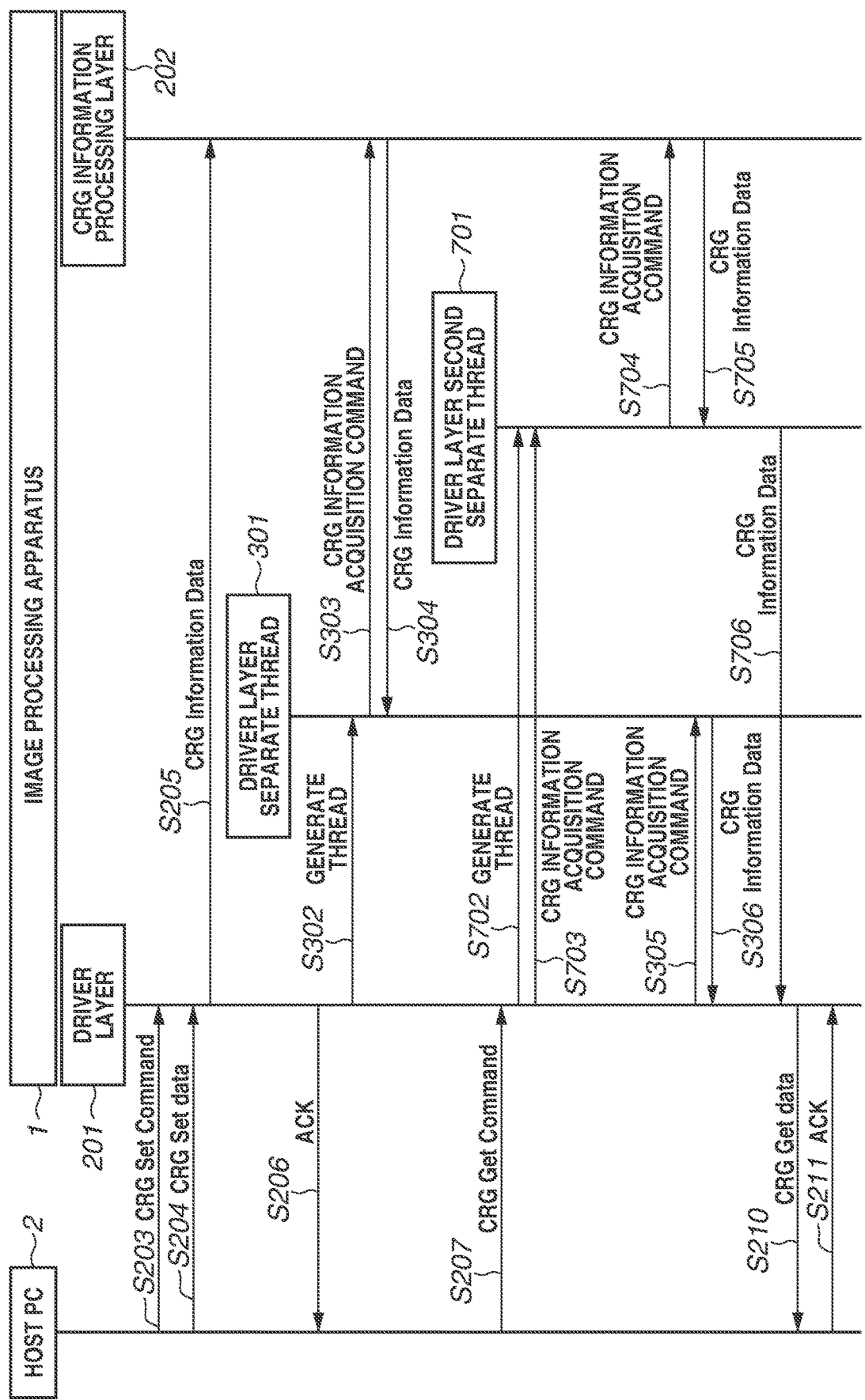
FIG. 7 is a sequence diagram of communication processing using control transfer in a second example embodiment.

The processing to solve this issue is illustrated in the sequence diagram of FIG. 7. The differences from the sequence diagram in FIG. 3 are explained below.

FIG. 7 is a sequence diagram illustrating an example of communication processing using control transfer with the host PC 2 and the image processing apparatus 1 according to the second example embodiment, and the same component as in FIG. 3 is denoted by the same reference numeral.

As is the case with FIG. 3, in step S702, the driver layer 201 that has acquired the CRG Get Command from the host PC 2 in the processing of step S207 generates a driver layer second separate thread 701, which is a second separate thread for generating a new CRG information acquisition command. The driver layer second separate thread 701 literally operates in a separate thread from the driver layer 201.

In step S703, the driver layer 201 transmits a CRG information acquisition command to the driver layer second separate thread 701.

Upon receipt of the command in step S703, in step S704, the driver layer second separate thread 701 transmits the CRG information acquisition command to the CRG information processing layer 202.

Upon receipt of the command in step S704, in step S705, the CRG information processing layer 202 generates the CRG Information Data and returns the data to the driver layer second separate thread 701.

In step S706, the driver layer second separate thread 701 returns the data acquired in step S705 to the driver layer 201.

The driver layer 201 waits for a response (step S706) from the driver layer second separate thread 701, for 500 ms−α time (α is a positive value and a small value of about 10 ms to 50 ms) after receiving the CRG Get Command from the host PC 2 in step S207. However, if the response of step S706 is not made even after waiting for 500 ms−α time, in step S210, the driver layer 201 returns the CRG Get data to the host PC 2 with the data acquired in step S306 beforehand.

On the other hand, if the CRG Information Data has been acquired in step S706 within 500 ms−α time, in step S210, the driver layer 201 transmits the data acquired in step S706 to the host PC 2 as the CRG Get data. In this case, the information in the CRG Get data which the host PC 2 acquires as a result of the CRG Get Command can be the latest data.

In FIG. 7, the sequence of the present example embodiment is illustrated. Next, the operation of the respective software modules (the driver layer 201, driver layer second separate thread 701, and CRG information processing layer 202) of the image processing apparatus 1 will be described using the flowcharts of FIGS. 8, 9, and 10. Since there is no change from the first example embodiment with respect to the flowchart of the driver layer separate thread 301, the description is omitted.

Figure 8:
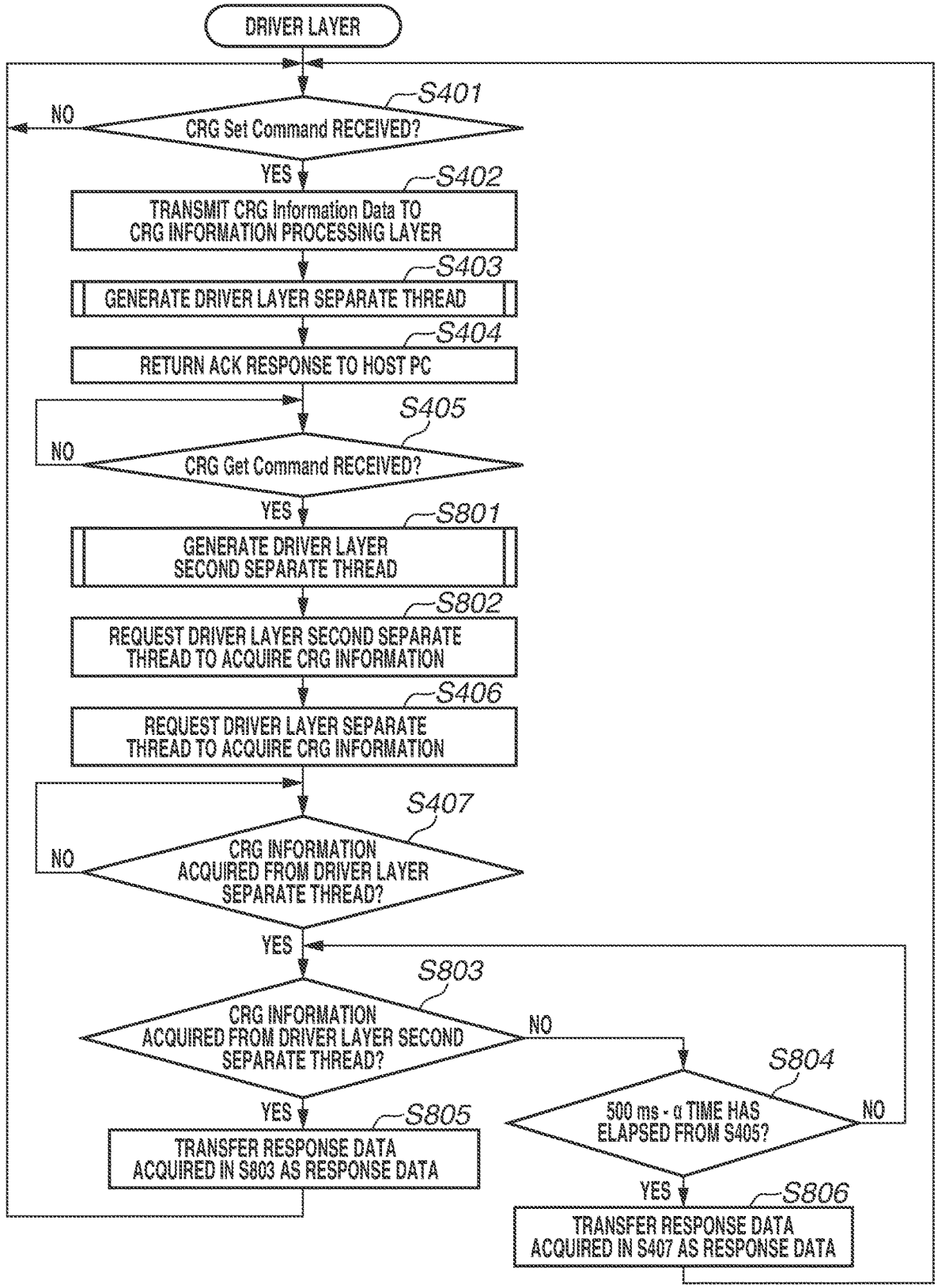
FIG. 8 is a flowchart illustrating an operation of a driver layer according to the second example embodiment.

FIG. 8 is a flowchart illustrating an example of the operation of the driver layer 201 according to the second example embodiment, in which the same step as in FIG. 4 is denoted by the same step number. The processing of this flowchart is implemented by the CPU 101 of the image processing apparatus 1 loading a program stored in the HDD 103 or the like into the RAM 104 and executing the program or the like.

Figure 9:
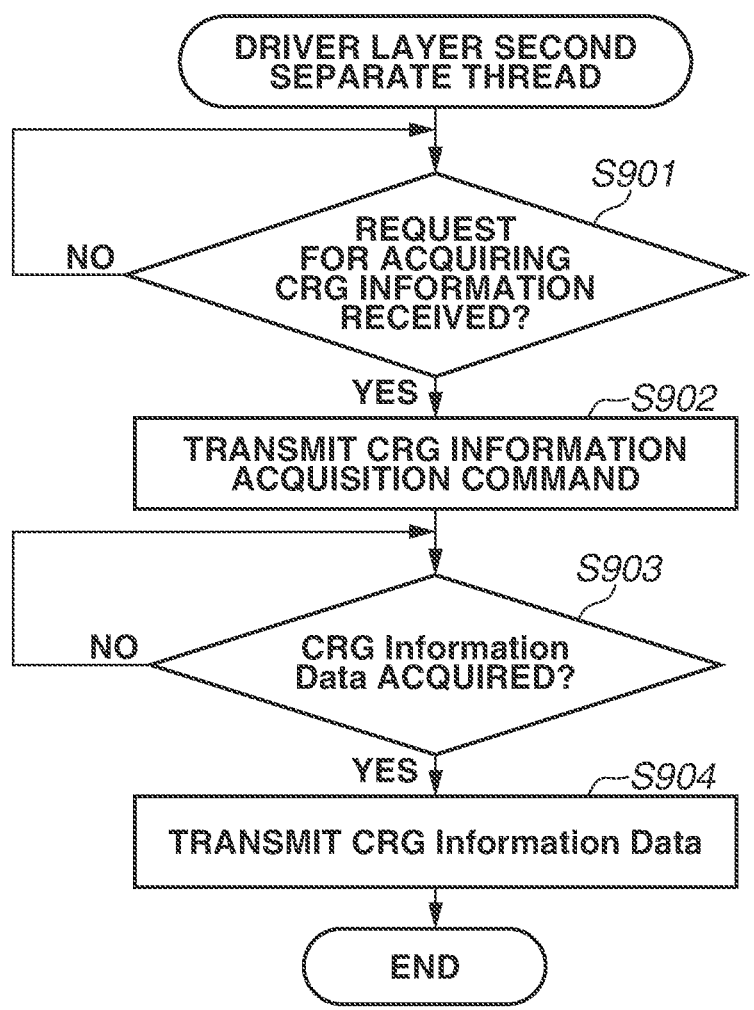
FIG. 9 is a flowchart illustrating an operation of a driver layer separate thread according to the second example embodiment.

Upon receipt of the CRG Get Command (Yes in step S405), in step S801, the CPU 101 (driver layer 201) of the second example embodiment generates the driver layer second separate thread 701. The processing of the driver layer second separate thread 701 is illustrated in FIG. 9 described below.

After completing the processing of step S801, in step S802, the CPU 101 (driver layer 201) requests the driver layer second separate thread 701 to acquire CRG information.

In step S406, the CPU 101 (driver layer 201) then requests the driver layer separate thread 301 to acquire the CRG information.

If the CPU 101 (driver layer 201) has acquired the CRG Information Data from the driver layer separate thread 301 (Yes in step S407), the processing proceeds to step S803.

In step S803, the CPU 101 (driver layer 201) waits for CRG Information Data to be sent from the driver layer second separate thread 701. In step S804, the CPU 101 (driver layer 201) determines whether the response waiting time has elapsed 500 ms–α time from the CRG Get Command acquisition time. If the 500 ms–α time has not elapsed (No in step S804), the CPU 101 (driver layer 201) continues to wait for CRG Information Data to be sent, in step S803.

If the 500 ms–α time has not elapsed (No in step S804), the CPU 101 (driver layer 201) continues to wait for CRG Information Data to be sent, in step S803. If the CPU 101 (driver layer 201) has acquired the CRG Information Data from the driver layer second separate thread 701 before 500 ms–α time elapses (Yes in step S803), the processing proceeds to step S805.

In step S805, the CPU 101 (driver layer 201) transmits the data acquired in step S803 to the host PC 2 via the USB device OF 108.

On the other hand, if the response waiting time exceeds the 500 ms–α time before the CPU 101 (driver layer 201) acquires the CRG Information Data from the driver layer second separate thread 701 (Yes in step S804), the processing proceeds to step S806.

In step S806, the CPU 101 (driver layer 201) transmits the data acquired in step S407 to the host PC 2 via the USB device OF 108.

In other words, if CRG Information Data has been acquired via the driver layer second separate thread 701 within a predetermined time (500 ms–α time in the above example) (Yes in step S803), in step S805, the CRG Information Data is transmitted to the host PC 2. On the other hand, if the CRG Information Data has not been acquired via the driver layer second separate thread 701 within the predetermined time (Yes in step S804), in step S806, the driver layer separate thread 301 transmits the CRG Information Data acquired in advance to the host PC 2.

After the processing of step S805 or step S806, the processing returns to step S401, and the CPU 101 (driver layer 201) waits to receive the next CRG Set Command.

FIG. 9 is a flowchart illustrating an example of the operation of the driver layer second separate thread 701 according to the second example embodiment. The processing of this flowchart is implemented by the CPU 101 of the image processing apparatus 1 loading a program stored in the HDD 103 or the like into the RAM 104 and executing the program or the like.

Once generated, in step S901, the CPU 101 (driver layer second separate thread 701) waits for a request by the driver layer 201 for acquiring CRG information. Upon receipt of the request in the processing of step S901 (Yes in step S901), in step S902, the CPU 101 (driver layer second separate thread 701) transmits a CRG information acquisition command to the CRG information processing layer 202.

After the processing of step S902, in step S903, the CPU 101 (driver layer second separate thread 701) waits until the CRG Information Data has been able to be acquired from the CRG information processing layer 202.

If the CPU 101 (driver layer second separate thread 701) has acquired the Data in the processing of step S903 (Yes in step S903), the processing proceeds to step S904. In step S904, the CPU 101 (driver layer second separate thread 701) holds the data acquired in step S903 on the RAM 104, transmits the data to the driver layer 201 as the CRG Information Data, and ends the processing.

Figure 10:
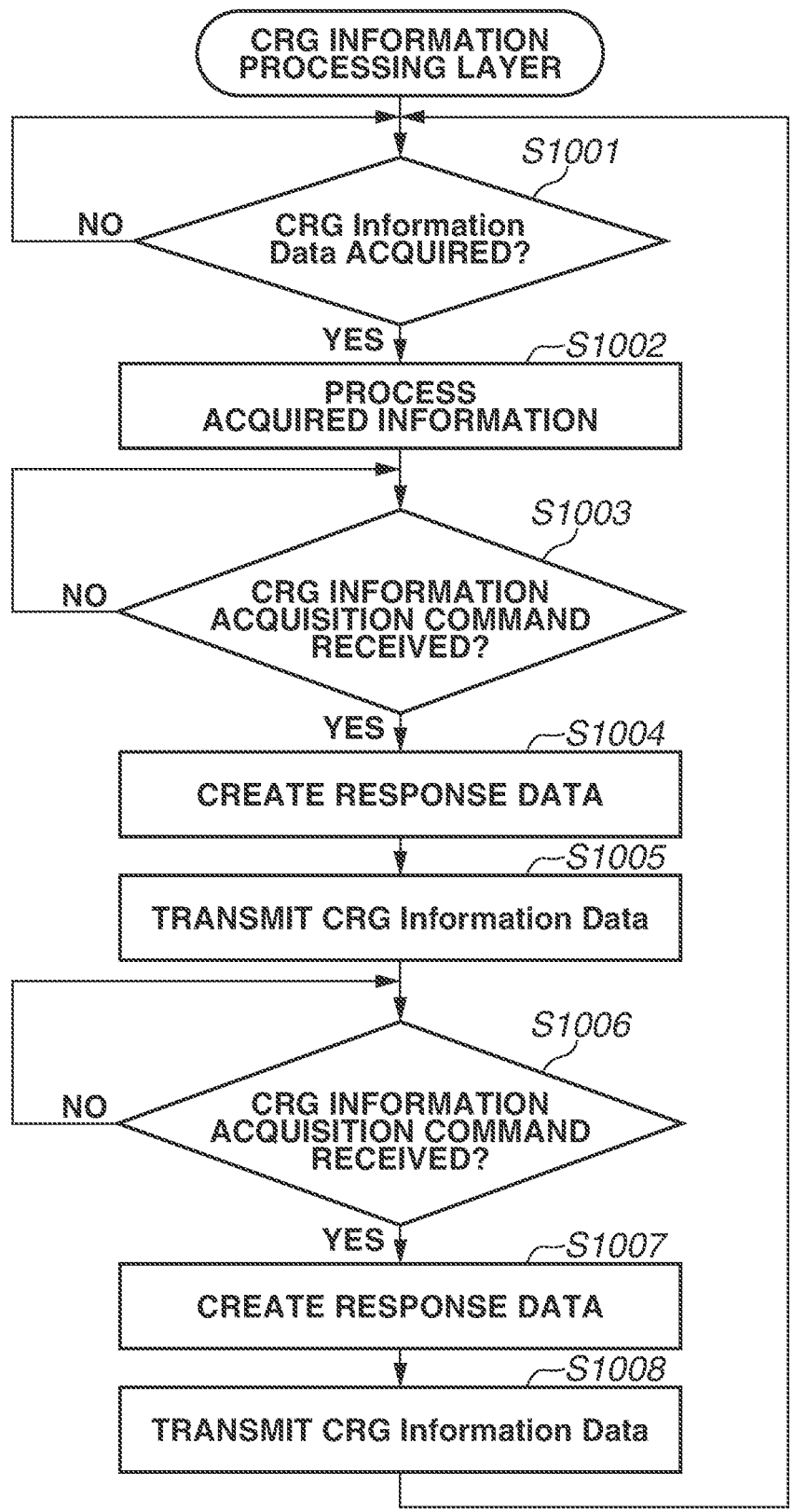
FIG. 10 is a flowchart illustrating an operation of a CRG information processing layer according to the second example embodiment.

FIG. 10 is a flowchart illustrating an example of the operation of the CRG information processing layer 202 according to the second example embodiment. The processing of this flowchart is implemented by the CPU 101 of the image processing apparatus 1 loading a program stored in the HDD 103 or the like into the RAM 104 and executing the program or the like.

In step S1001, the CPU 101 (CRG information processing layer 202) waits to receive the CRG Information Data from the driver layer 201.

Upon receipt of the CRG Information Data (Yes in step S1001), in step S1002, the CPU 101 (CRG information processing layer 202) communicates with the CRG 124 on the basis of the received information, and processes a specified command.

In step S1003, the CPU 101 (CRG information processing layer 202) waits to receive a CRG information acquisition command. Here, the CRG information acquisition command is transmitted from the driver layer separate thread 301. Upon receipt of the CRG information acquisition command (Yes in step S1003), in step S1005, the CPU 101 (CRG information processing layer 202) communicates with the CRG 124, acquires the CRG information, and creates the response data.

In step S1005, the CPU 101 (CRG information processing layer 202) transmits the data created in step S1004 back to the transmitter of the CRG information acquisition command (driver layer separate thread 301 in the above example).

In step S1006, the CPU 101 (CRG information processing layer 202) waits to receive a CRG information acquisition command. Here, the CRG information acquisition command is transmitted from the driver layer second separate thread 701. Upon receipt of the CRG information acquisition command (Yes in step S1006), in step S1007, the CPU 101 (CRG information processing layer 202) communicates with the CRG 124, acquires the CRG information, and creates the response data.

In step S1008, the CPU 101 (CRG information processing layer 202) transmits the data created in step S1007 back to the transmitter of the CRG information acquisition command (driver layer second separate thread 701 in the above example). After the processing of step S1008, the processing returns to step S1001, and the CPU 101 (CRG information processing layer 202) waits to receive the next CRG Information Data.

The sequence illustrated in FIG. 7 and the processing of each software module illustrated in FIGS. 8, 9, and 10 make it possible to make a reply within 500 ms of the control transfer to the host PC 2 regardless of the load status of the CPU 101 of the image processing apparatus 1. It becomes possible to return the latest CRG information.

According to each example embodiment, in the control communication of USB in which communication is performed at Endpoint 0, it becomes possible to return the data requested by the host PC without causing a timeout of the GET command that requires a response within 500 ms.

In the above example, the control transfer between the host PC 2 and the image processing apparatus 1 is described using an example of processing in which the host PC 2 inquires about the remaining amount of toner or the like of the CRG 124 stored in the printer 119 disposed inside the image processing apparatus 1. However, the control transfer of the present example embodiment may include anything in which the host PC acquires requested data from a USB device such as an image processing apparatus. The data that the host PC acquires from the USB device by the control transfer may also be any data.

According to the above, in the control communication of USB in which communication is performed at Endpoint 0, it becomes possible to return the data requested by the host PC without causing a timeout of the GET command that requires a response within 500 ms. In other words, a timeout in USB control transfer between a USB host and a USB device can be avoided.

The configuration of the various data described above and the content thereof are not limited to the above examples, and it goes without saying that they may include various configurations and content in accordance with the application and purpose.

Various embodiments of the present disclosure can be implemented, for example, as a system, apparatus, method, program, or storage medium. Among other things, the present invention may be applied to a system including a plurality of devices, or to an apparatus composed of a single device.

Configurations in which the above example embodiments are combined in different combinations are also all included in the present disclosure.

OTHER EMBODIMENTS

Various embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)?), a flash memory device, a memory card, and the like.

While example embodiments have been described, it is to be understood that the invention is not limited to the disclosed example embodiments. The scope of the following claims is to be accorded the broadest interpretation so as to encompass all such modifications and equivalent structures and functions.

This application claims the benefit of Japanese Patent Application No. 2020-191448, filed Nov. 18, 2020, which is hereby incorporated by reference herein in its entirety.

What is claimed is:

1. A method for controlling an image forming apparatus capable of communicating via a USB cable with an information processing apparatus in accordance with a specification of USB, the method provided by executing a first software module of the image forming apparatus comprising:
    receiving, from the information processing apparatus, a first command regarding information of a cartridge attached to the image forming apparatus;
    instructing a second software module to generate the information of the cartridge in response to a reception of the first command;
    obtaining from the second software module the information of the cartridge regardless of whether a second command regarding the information of the cartridge is received or not;
    receiving, from the information processing apparatus, the second command regarding the information of the cartridge; and
    transmitting, to the information processing apparatus, the obtained information as a response to the received second command.

2. The method according to claim 1, wherein the first software module is a driver layer.

3. The method according to claim 1, wherein the first command and the second command are transmitted in a control transfer protocol of the USB communication.

4. The method according to claim 3, wherein the first command and the second command are transmitted by using a predetermined channel.

5. The method according to claim 4, wherein the predetermined channel corresponds to a communication port called Endpoint 0.

6. The method according to claim 1, further comprising:
    transmitting an ACK signal to the information processing apparatus in response to the first command without transmitting the information obtained from the second software module.

7. The method according to claim 1, wherein the information of the cartridge indicates an amount of recording material contained in the cartridge.

8. The method according to claim 1, further comprising:
    instructing the second software module to generate the information of the cartridge in response to a reception of the second command;

transmitting the information of the cartridge corresponding to the second command to the information processing apparatus in a case that the first software module obtains the information corresponding to the second command in a predetermined period: and transmitting the information of the cartridge corresponding to the first command to the information processing apparatus in a case that the first software module does not obtain the information corresponding to the second command in the predetermined period.

9. The method according to claim 8, wherein the predetermined period is set based on the specification.

10. The method according to claim 1, wherein the first command and the second command are vendor class commands.

11. A non-transitory computer-readablevolatilo storage medium storing a first software module causing an image forming apparatus that is capable of communicating via a USB cable with an information processing apparatus in accordance with a specification of USB to execute a method for controlling an information processing apparatus, the method comprising:

receiving, from the information processing apparatus, a first command regarding information of a cartridge attached to the image forming apparatus;

instructing a second software module to generate the information of the cartridge in response to a reception of the first command;

obtaining from the second software module the information of the cartridge regardless of whether a second command regarding the information of the cartridge is received or not;

receiving, from the information processing apparatus, the second command regarding the information of the cartridge; and transmitting, to the information processing apparatus, the obtained information as a response to the received second command.

\* \* \* \* \*